March 16, 1943. C. B. BOGUE 2,313,860
MACHINE FOR VIEWING, CUTTING, AND SEGREGATING PHOTOGRAPHIC FILM
Original Filed Oct. 7, 1941 2 Sheets-Sheet 1

INVENTOR,
Charles B. Bogue
BY
J. E. Trabucco
ATTORNEY.

March 16, 1943.  C. B. BOGUE  2,313,860
MACHINE FOR VIEWING, CUTTING, AND SEGREGATING PHOTOGRAPHIC FILM
Original Filed Oct. 7, 1941   2 Sheets-Sheet 2

INVENTOR,
Charles B. Bogue
BY
J. E. Trabucco
ATTORNEY.

Patented Mar. 16, 1943

2,313,860

UNITED STATES PATENT OFFICE 2,313,860

MACHINE FOR VIEWING, CUTTING, AND SEGREGATING PHOTOGRAPHIC FILM

Charles B. Bogue, San Francisco, Calif.

Original application October 7, 1941, Serial No. 413,931. Divided and this application July 1, 1942, Serial No. 449,340

9 Claims. (Cl. 164—68)

This invention relates to improved means for viewing, cutting and segregating parts of photographic film.

The present invention is directed particularly to an improved method and novel apparatus for viewing, cutting and segregating cinematographic film having photographic reproductions of recorded documents relating to property transfers or the like, whereby in making use of such classified and segregated film, one may readily select and view any one of several reproduced documents for the purpose of passing on questions relating to title. In carrying out my invention a moving picture camera is first employed to produce successive exposures on a negative photographic film of a number of recorded documents, there also being simultaneously photographed a suitable mark, which, when a positive film is made from the negative, will serve to intercept a beam of light proceeding to a photo-electric cell and thereby cause the automatic operation of an electrical film cutter.

An object of my invention is to provide an improved machine having means for automatically cutting successive parts of a photographic film and for segregating the several parts so they are selectively arranged, in accordance with one or more common characteristics, into certain related groups.

Another object of my invention is to provide an improved method and novel apparatus for cutting and segregating photographic film.

Other and further objects of my invention will be pointed out hereinafter, or will be indicated in the appended claims, or will be obvious to one skilled in the art upon an understanding of the present disclosure. For the purpose of this application I have elected to show herein certain forms and details of a machine for viewing, cutting and segregating photographic film which is representative of my invention; it is to be understood, however, that the embodiment of my invention herein shown and described is for the purpose of illustration only, and that therefore it is not to be regarded as exhaustive of the variations of the invention.

This is a division of my application Serial No. 413,931, filed October 7, 1941, entitled "Machine for viewing, cutting, and segregating photographic film."

In the accompanying drawings:

Fig. 4 is an enlarged sectional view taken on the line 4—4 of Fig. 2, showing a part of the electrically operated means for actuating the film cutter;

Figure 1:
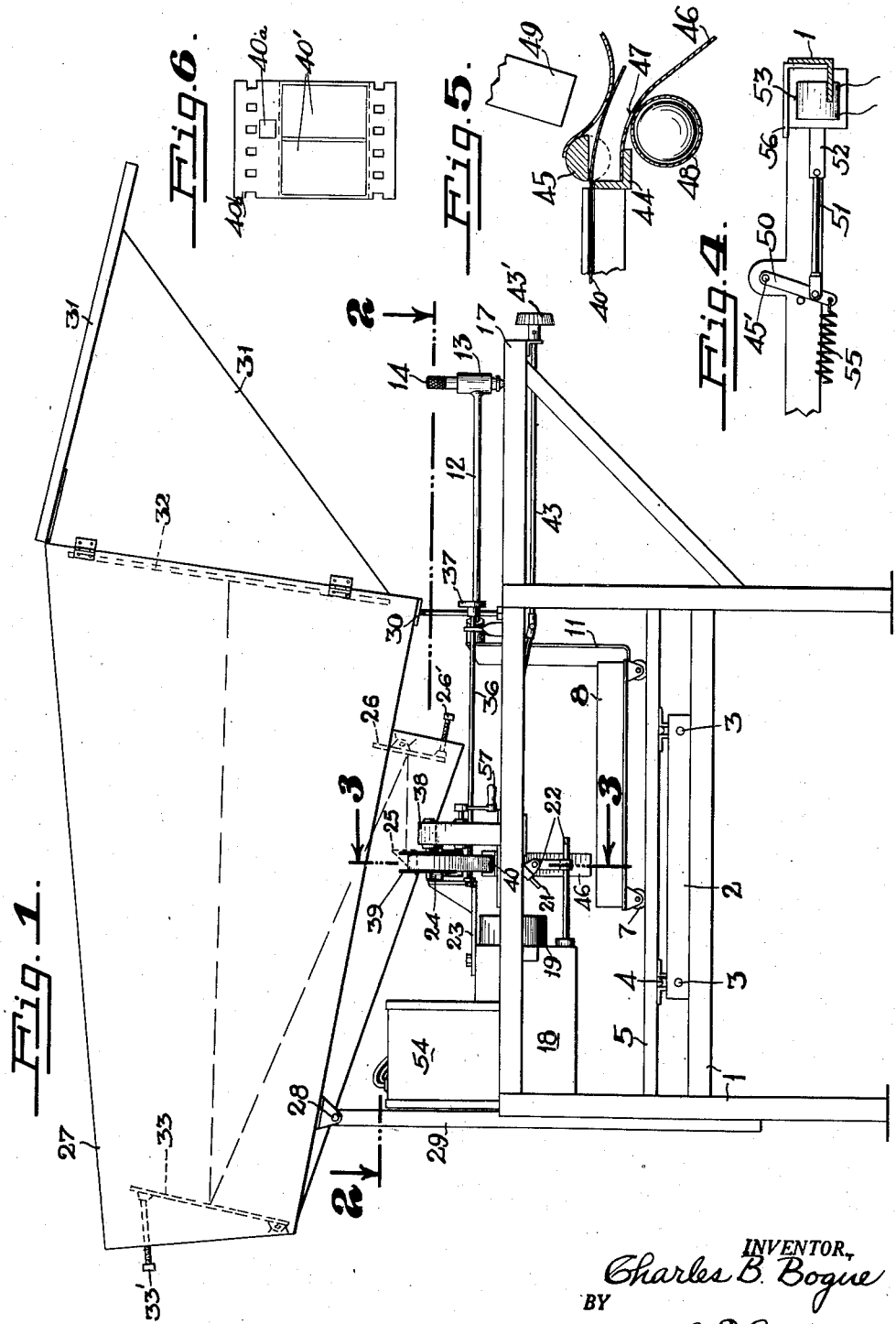
Fig. 1 is a side view of a film viewing, cutting, and segregating machine embodying the preferred principles of my invention.
Figure 2:
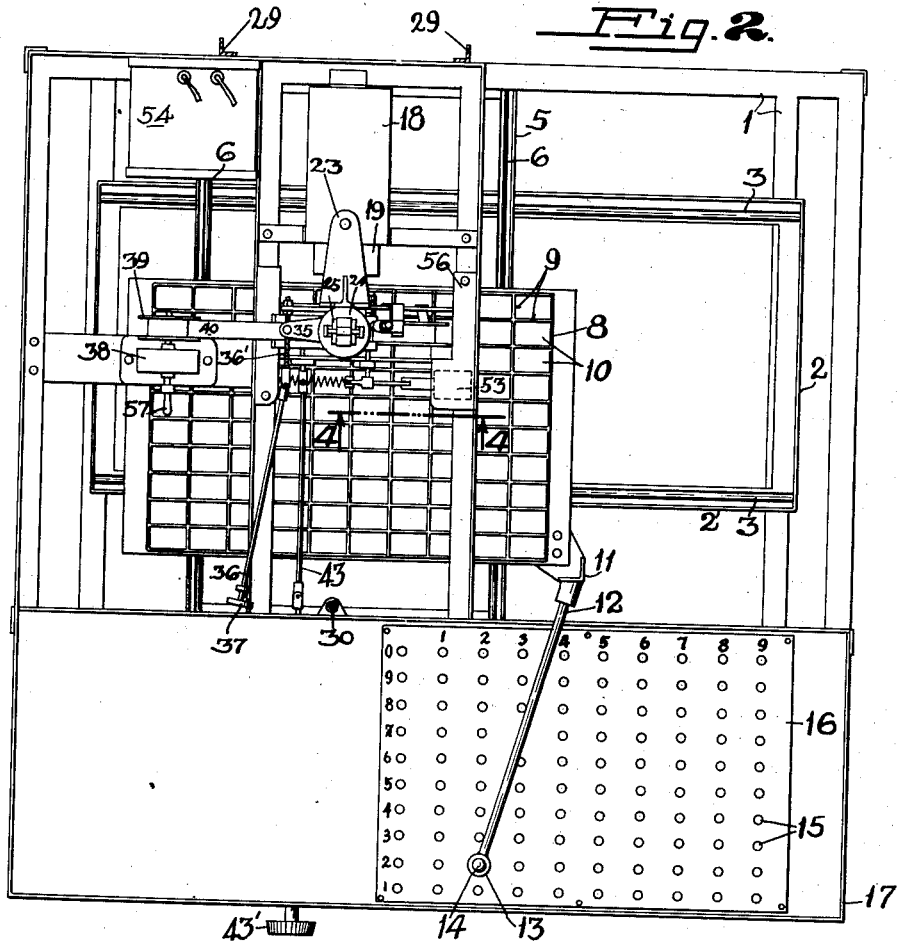
Fig. 2 is a sectional view taken on the line 2—2 of Fig. 1.

Fig. 5 is an enlarged detailed sectional view showing the film cutter and another part of means for actuating the film cutter; and Fig. 6 shows a fragmentary part of a photographic film produced in accordance with my invention, having three exposed areas thereon, the two larger of which are preferably images of adjacent pages of a book containing recorded documents, and the smaller of which is a darkened exposed area for momentarily intercepting a beam of light passing through the film.

In carrying out the present invention I provide a supporting frame 1 made preferably from angle irons which are arranged to suitably support the various parts of the machine. Mounted on the frame beneath the top part thereof is a rectangular shaped supporting structure 2 made preferably from angle irons, and having a pair of parallel roller guide rods 3 supported by its lateral ends. Movably positioned on the guide rods 3 are rollers 4 which are carried by and serve to support a rectangular frame 5. Secured to the forward and rear ends of the frame 5 are another pair of roller guide rods 6 which are positioned at right angles to the first mentioned rods 3. Rotatably positioned on the guide rods 6 are rollers 7 which are carried by and serve to support a rectangular tray 8 which is divided by a series of intersecting partition members 9 into a plurality of open compartments 10. The tray 8 may be moved back and forth in a direction parallel to the rods 6, and it may also be moved together with the rectangular frame 5 in a direction parallel to the rods 3. Thus the tray may be moved to positions where any one of its compartments 10 is positioned to receive a severed segment of a film delivered by an overlying film delivery chute, as will be later described. Secured to a corner of the tray 8 is an upright member 11 having a forwardly disposed horizontal rod 12 rigidly secured to its upper end. The forward free end of the rod 12 is provided with a sleeve 13 through which a vertical pointer 14 movably extends. The pointer is capable of being manually lifted so its lower pointed end may be disengaged from the particular groove 15 of a rectangular board 16 with which it engages. The board 16 is securely mounted on a forwardly disposed table 17 supported by the frame 1. The outside shape and size of the board 16 corresponds substantially to the shape and size of the tray 8, and the grooves 15 are arranged in accordance with the relative positions of the compartments 10. The transverse rows of grooves 15 are successively marked by numerals appearing on the left hand side of the board, and similarly, the various rows of grooves commencing from the rear and proceeding forwardly are also suitably marked. Each of the grooves 15 is associated with a particular compartment 10 of the tray 8, and while the various compartments are not shown on the drawings as being consecutively numbered, it is contemplated that they be so designated. The moving of the pointer 14 to a position where it engages with a certain groove 15, will simultaneously move the tray 8 to a position where a corresponding compartment 10 is positioned beneath the film delivery chute. On the drawings the pointer 14 is shown in engagement with a particular groove 15 which happens to be known as number 22, and it is understood by observing the particular position of the pointer that a certain compartment 10 which is also known as number 22 is positioned beneath the film delivery chute.

Supported at the rear side of the frame 1 is a housing 18 within which a source of light (not shown) is positioned. A lens tube 19 holding a lens 20 projects forwardly from the light housing, and positioned to intercept the light rays passing through the said lens is a mirror 21, the latter being suitably mounted on a supporting structure 22 secured to the housing. Mounted on a bracket 23 which is secured to the light housing 18 is a vertically disposed lens tube 24 which has a suitable lens (not shown) mounted therein. The lens tube is positioned directly above the mirror 21 and the lens therein is disposed with its axis at right angles to the said mirror. Supported above the lens tube 24 is a light reflecting prism 25 which is mounted to reflect the light rays passing upwardly through the vertical lens tube in a forward direction and onto an adjustable mirror 26. The mirror 26 is mounted inside and at the lower side of a suitably shaped enclosure 27. The rear end of the enclosure is pivotally mounted as at 28 on the upper end of vertical posts 29 secured to the frame 1, and the said enclosure's forward end is normally supported by a detachable upright brace 30. The forward end of the enclosure is provided with hinged side wings 31 which shield a frosted translucent panel 32 mounted at the forward end of the said enclosure from extraneous light rays. At the rear of the enclosure is an adjustable mirror 33 which is positioned to intercept and reflect the light rays proceeding from the mirror 26 onto the translucent frosted panel 32. Suitable adjusting screws 26' and 33' are associated with the mirrors 26 and 33, respectively, for adjusting purposes. When not being used the enclosure 27 may be swung rearwardly about its pivot 28 to a position where it does not overly the frame 1.

Figure 3:
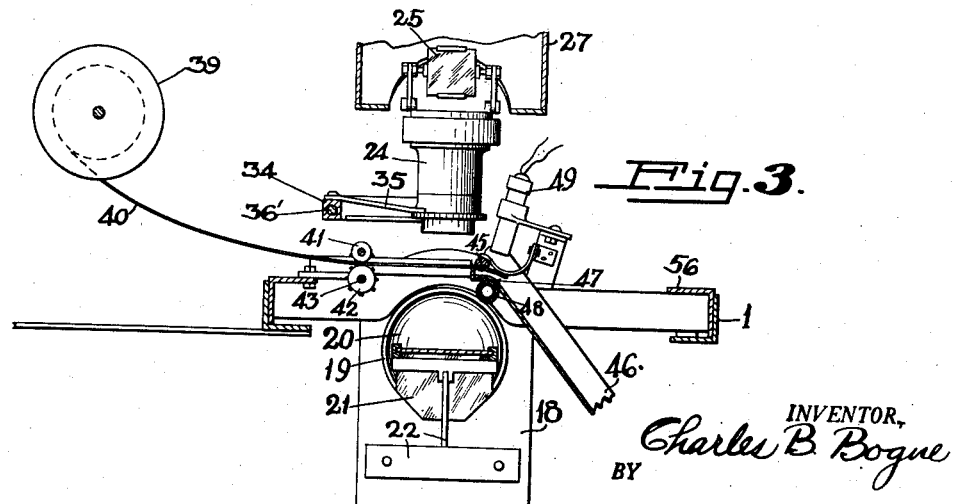
Fig. 3 is an enlarged sectional view taken on the line 3—3 of Fig. 1.

The lens tube 24 comprises a lower adjustable section which is capable of being rotated for the purpose of bringing the lens it mounts into proper focus with respect to the mirror 21 and the prism 25. A nut 34 (see Fig. 3) connected by a bar 35 to the lower rotatable section of the lens tube 24 is operatively engaged by the threaded section 36' of a forwardly disposed rotatable shaft 36. The turning of a hand piece 37 provided on the forward end of the shaft 36 causes the rotation of the said shaft and the movement of the nut 34 backwardly or forwardly, thereby causing the lower section of the lens tube 24 to be turned so as to adjust the position and focus of the lens carried by the latter.

Rotatably mounted on a structure 38 supported on the frame 1 is a reel 39 which normally carries a film 40. The film 40 is preferably one which has been printed from a negative previously made in accordance with my invention. The film 40 has successive pairs of images 40' (see Fig. 6) which are reproductions of opposite pages of a record book containing recorded documents. The film may have a series of single images produced thereon, or it may be provided with any other number of images if so desired. At points on the film adjacent the pairs of images are darkened exposed areas or spots 40a which are so positioned with respect to the images 40' as to cause the cutting of the film along a line adjacent but not intersecting an image, as will be later described.

The film 40 extends downwardly from the reel 39 and is led between a roller 41 and a sprocket 42, the latter being secured to the rear end of a rotatable shaft 43. The shaft 43 extends forwardly to the front end of the table 17 and secured thereto is a hand piece 43' which provides suitable means for turning the shaft and the sprocket. The turning of the hand piece, the shaft and the sprocket causes the sprocket to suitably advance the film at a desirable speed. The film extends between the mirror 21 and the lens tube 24, and the light rays directed therethrough cause an image appearing thereon to be projected onto the frosted panel 32 where it may be viewed by an operator positioned in front of the enclosure 27. The film extends over a supporting member 44 which, together with a rotatable cutter 45, provides means for cutting the film. The film extends into the upper end of an inclined delivery chute 46, and across a small hole 47 provided therein (see Figs. 3 and 5). The hole 47 is so positioned with respect to the normal position of the film that the darkened spot 40a passes directly over the said hole. Beneath the hole 47 in the chute 46 is a photo-electric cell 48 which is electrically connected in the usual manner to suitable electrical apparatus for actuating the cutter 45. A tubular member 49 provided therein with a light source is supported so as to direct a light beam downwardly through the hole 47. When a darkened spot 40a on the film 40 passes over the hole 47 in the chute 46 the light beam striking the photo-electric cell 48 is broken and the cutter 45 is thereupon electrically operated to cut a section or segment 40b from the said film. The electrical means for actuating the cutter (see Fig. 4) comprises a crank 50 secured at one end to the axis 45' of the cutter 45. The lower end of the crank is connected to a rod 51 which in turn is connected to the armature 52 of an electro-magnet 53. The electro-magnet is electrically connected to a relay 54 which in turn is electrically connected to the photo-electric cell. A spring 55 connected to the lower end of the crank 50 returns the crank, the cutter 45 and the armature 52 to their normal positions after the electro-magnet has become de-energized. The electro-magnet 53 is energized when the light beam to the photo-electric cell is broken, and at this moment the cutter 45 is actuated so as to cut the film 40. As soon as the severed segment 40b of film drops through the chute, the light beam to the photo-electric cell is restored and the circuit to the electromagnet is again opened.

In ordinary practice, an operator viewing an image projected from the film 40 onto the frosted panel 32, will be prompted by a particular number or other characteristic appearing on the image, to move the tray 8 to a position where a certain predetermined compartment 10 is directly beneath the lower end of the film delivery chute 46. Then, as the hand piece 43' is rotated in the proper direction, the film with its said viewed image will be advanced to a point where the darkened spot 40a thereon will intercept the light beam and cause the operation of the cutter 45. The cut segment 40b of the film will fall through the chute 46 and into the particular compartment 10 of the tray which is positioned beneath the discharge end of the said chute.

The film advancing mechanism, the photo-electric cell, the chute, the cutting mechanism and the tubular member containing the light source are all preferably mounted on a detachable sub-frame 56 which is removably mounted on the frame 1. For the purpose of winding film on the reel 39, a crank 57 is operatively connected to the spindle which mounts the said reel.

After the film 40 has been suitably cut into a number of segments 40b and the segments have been segregated and grouped in the manner above described, it may be found desirable to again separate the grouped segments and rearrange them in accordance with an index or planned classification.

While my invention has been described with reference to recorded documents, it is to be understood that the same system and apparatus is capable of being successfully used for various purposes other than the example given.

Having described my invention, what I claim is:

1. A method of cutting and segregating photographic film having a series of images reproduced thereon comprising separately projecting and viewing the images, and in accordance with a certain characteristic appearing on a projected image, selectively positioning one of several receptacles to receive the part of the film having the projected image thereon when it is cut from the film, and subsequently cutting that part of the film having the projected image thereon so it may be deposited in the selected receptacle.

2. A machine for viewing, cutting and segregating photographic film comprising light projecting means arranged to successively project images appearing on a photographic film onto a surface where they may be viewed, means arranged to successively cut segments from the film, a film segment holder having a plurality of compartments for receiving the film segments cut from the film, and means for adjusting the position of the film segment holder so the compartments thereof may be selectively positioned in accordance with certain characteristics appearing on the projected images to receive the film segments as they are successively cut from the film.

3. A machine for viewing, cutting and segregating photographic film having light interrupting means arranged thereon at spaced intervals, comprising light projecting means arranged to successively project images appearing on the photographic film onto a surface where they may be viewed, a cutter arranged to successively cut film segments from the film, electrical means adapted to be successively actuated in accordance with the interruption of certain light rays passing through the film for actuating the cutter, a film segment holder having a plurality of compartments for receiving the film segments cut from the film, and means for adjusting the position of the film segment holder so the compartments thereof may be selectively positioned in accordance with certain characteristics appearing on the projected images to receive the film segments as they are successively cut from the film.

4. A machine for viewing, cutting and segregating photographic film having successive images and spaced means arranged thereon adjacent the successive images for interrupting the passage through the film of certain light rays, light projecting means arranged to successively project the images appearing on the film onto a surface where they may be viewed, a cutter arranged to successively cut film segments from the film, electrical means responsive to the interruption of certain light rays passing through the film for actuating the cutter, whereby film segments may be successively cut from the film in accordance with the interrupting of the said certain light rays by the spaced interrupting means on the film, and means for successively receiving and grouping the severed film segments in accordance with certain characteristics appearing on the projected images.

5. A machine for viewing, cutting and segregating photographic film having successive images and spaced opaque means arranged thereon adjacent the successive images for interrupting the passage of certain light rays, light projecting means arranged to successively project the images appearing on the film onto a surface where they may be viewed, a cutter arranged to successively cut film segments from the film, and electrical means responsive to the interruption of certain light rays passing through the film for actuating the cutter, whereby film segments may be cut from the film in accordance with the interrupting of said certain light rays by the spaced opaque means on said film.

6. A machine for viewing, cutting and segregating photographic film having successive images and spaced associated opaque areas thereon, light projecting means arranged to successively project the images appearing on the film onto a surface where they may be viewed, a cutter arranged to successively cut film segments from the film after the images are successively projected, means arranged to direct a light beam through the film at points where the opaque areas may intercept the same, and electrical means responsive to the interruption of the light beam by the opaque areas on the film for actuating the cutter.

7. A machine for viewing, cutting and segregating photographic film having successive images and spaced associated opaque areas thereon, light projecting means arranged to successively project the images appearing on the film onto a surface where they may be viewed, a cutter arranged to successively cut film segments from the film after the images are successively projected, electrical means responsive to the interruption by the opaque areas of a light beam passing through the film for actuating the cutter, whereby successive film segments may be cut from the film, a tray having a plurality of compartments arranged to selectively receive the film segments cut from the film, and means for adjusting the position of the tray so the compartments may be selectively positioned in accordance with the viewed images to receive the film segments as they are successively cut from the film.

8. In a machine for cutting photographic film having successive images and a plurality of spaced light modifying areas arranged in certain relation to the images, electrical cutting means arranged to cut successive segments from the film, and means responsive to the interruption of a light beam by the light modifying areas for actuating the cutting means whereby successive segments may be cut from the film and an adjustable film segment receiver having a plurality of separated areas arranged to selectively receive segments cut from the film.

9. In a machine for cutting photographic film having successive images and spaced opaque areas arranged thereon in certain relation to the images, electrical cutting means responsive to the interruption by the opaque areas of a light beam normally passing through the film, whereby successive segments may be cut from the film, and adjustable film segment receiving means having a plurality of compartments adapted to be selectively positioned to receive the film segments as they are cut from the film.

CHARLES B. BOGUE.